United States Patent
Boie et al.

[11] Patent Number: 5,517,012
[45] Date of Patent: May 14, 1996

[54] OPTICAL SCANNER

[75] Inventors: Robert A. Boie; Gabriel L. Miller, both of Westfield, N.J.

[73] Assignee: AT&T Corp., Murray Hill, N.J.

[21] Appl. No.: 303,248

[22] Filed: Sep. 8, 1994

[51] Int. Cl.$^6$ ............................................. G06K 7/10
[52] U.S. Cl. ........................................ 235/462; 235/454
[58] Field of Search ................................. 235/454, 455, 235/467, 469, 494, 472, 462; 359/189, 124; 307/311; 375/1

[56]              References Cited

U.S. PATENT DOCUMENTS

| 5,099,118 | 3/1992 | Francis | 250/308 |
| 5,214,527 | 5/1993 | Chang et al. | 359/189 |
| 5,229,588 | 7/1993 | Detwiler et al. | 235/467 |
| 5,329,115 | 7/1994 | Lim | 250/114 R |

FOREIGN PATENT DOCUMENTS

| 0166478 | 7/1987 | Japan | 235/455 |
| 2206716 | 1/1989 | United Kingdom | 235/462 |

OTHER PUBLICATIONS

P. Horowitz, *The Art Of Electronics*, Cambridge University Press, NY, Jan. 1989, pp. 88–89.

*Primary Examiner*—Donald T. Hajec
*Assistant Examiner*—Thien Minh Le
*Attorney, Agent, or Firm*—David M. Rosenblatt

[57]            ABSTRACT

A circuit that prevents optical screening systems from being pinned in an inoperative state under certain light conditions. The invention accomplishes this by using a circuit comprising a photodetector for converting scattered light from a visual code (e.g., universal product code) into current and a current limiting circuit coupled to the photodetector for limiting the current capable of passing through the photodetector.

15 Claims, 1 Drawing Sheet

OPTICAL SCANNER

FIELD OF THE INVENTION

The present invention relates to optical scanners. More particularly, the present invention relates to decreasing the effect of intense extraneous flashes of light on bar code scanners.

BACKGROUND OF THE INVENTION

Bar code scanning systems are well known and widely used in supermarkets and other stores. These systems essentially operate by scanning a light beam (e.g., from a laser) over a bar code label (e.g., utilizing a universal product code ("UPC")) affixed to an item and identifying the item based upon the light scattered by the label. The code is associated with a product and price via a database. More specifically, UPC labels comprise a series of black and white stripes. When the laser shines light upon the UPC, the black stripes absorb most of the light and the white stripes scatter most of the light. The scattered light is sensed by a photodetector which generates a current that is typically on the order of 0.1 microamps.

In a fixed scanning system, the item bearing the UPC label is moved over an opening in a scanning surface. The light beam passes through the opening and, hopefully, intersects the UPC label in such a way that the UPC made be read. In order to increase the probability that the light beam intersects the UPC label, the direction of the light beam is altered by a set of mirrors that is constantly rotated.

The photodetector is physically positioned such that is gathers light scattered from the UPC label. The photodetector may also receive extraneous light, including light from intense sources such as sunlight.

One would expect the scanning system to be inoperative during any period that intense light (e.g., sunlight) is received by the photodetector. This is became when exposed to such intense light, the photodetector may produce a current of as high as ~100 milliamps, which is on the order of one million times greater than the signal of interest generated by the photodetector in response to the light scattered by the UPC label. For this reason alone, existing bar code scanners are typically inoperative in the presence of bright sunlight. Another independent reason why bar code scanners are inoperative in the presence of bright sunlight is because noise contributions arising from the bright sunlight are about the same magnitude (0.1 microamp) as the signal of interest generated in response to the light scattered by the UPC label, making the light scattered by the UPC label difficult to interpret.

However, the problem with present scanning systems is that they are not only inoperative during the instant that intense light is encountered by the photodetector but in addition they take a long time to recover after an optical overload. An optical overload is considered to have occurred when the electrical system is driven beyond its design operating range. Consequently, present scanning systems remain disabled even during the time periods between intense periodic flashes of light. Thus, when the next intense flash of light occurs, the scanning system is disabled again. This occurs continually, due to the set of mirrors being rotated, and results in the scanning system being permanently held or "pinned" in an inoperative state as long as sunlight is present.

An attempt at solving this problem which has been made involves using a red piece of plastic to filter out extraneous light. However, even just the narrow bandwidth of red sunlight which passes through the filter is enough to pin the system in an inoperative state.

The problem with intense light is so acme that entire buildings (e.g., stores) are typically designed so that the bar code scanning devices will be exposed to minimal sunlight.

SUMMARY OF THE INVENTION

The present invention relates to a circuit that prevents scanning systems from being pinned in an inoperative state under certain light conditions. The present invention accomplishes this by using a circuit comprising a photodetector for converting scattered light from a visual code into current. Coupled to the photodetector is a current limiting circuit that places an upper bound on the current capable of passing through the photodetector.

Advantageously, the present invention enables the scanning system to recover rapidly from intense optical overloads, thus allowing operation of the scanning system to be essentially continuous.

Other advantages of the present invention will become apparent from the remainder of the specification.

DETAILED DESCRIPTION OF THE PREFERRED EMBODIMENT

Figure 1:
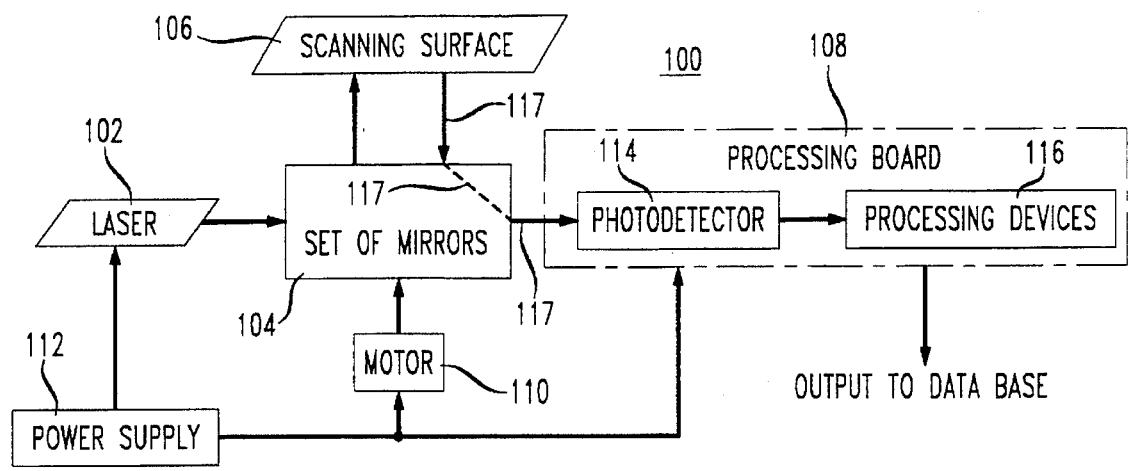
FIG. 1 shows a block diagram of a known bar code scanning system.

Referring to FIG. 1, a known bar code scanning system 100 is shown. The system 100 is comprised of a laser 102, a set of mirrors 104, a scanning surface 106, a processing board 108, a motor 110 to rotate the set of mirrors 104, and a power supply 112, all connected as shown. The processing board 108 is comprised of a photodetector 114 and other associated processing devices 116 that are used to process received signals and output information to, e.g., a database (not shown). The bar code scanning system 100 cannot accurately read UPCs in the time period immediately after intense light is encountered by the photodetector 114. The path along which all light going to the photodetector 114 travels is denoted by reference numeral 116.

The reason why bar code scanning system 100 cannot read UPCs in the time period immediately alter intense light is encountered by the photodetector 114 is because the set of mirrors 104 is rotated at about 100 revolutions per second. Consequently, optical overloads are encountered about 100 times every second. Since such systems do not "recover" within one one-hundredth of a second, the system is disabled by continual rapid flashes of light. As will be appreciated by those skilled in the art, reducing the rate at which the set of mirrors 104 rotates could reduce the problem, but would also decrease the chance that the laser beam would intersect the bar code, an undesirable, unacceptable result.

Figure 2:
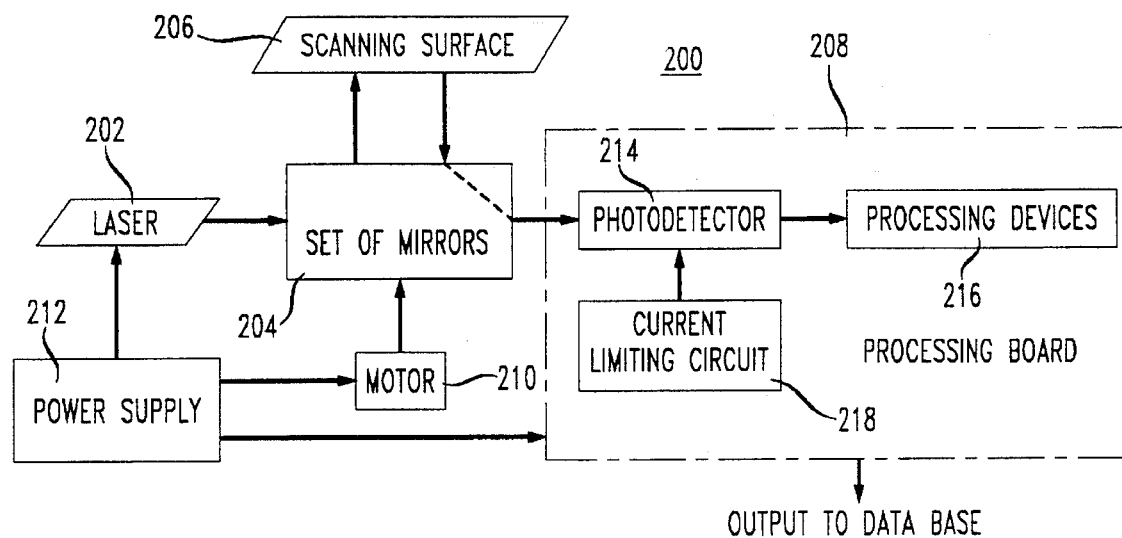
FIG. 2 shows a bar code scanning system made in accordance with the present invention.

Referring to FIG. 2, a bar code scanning system 200 made in accordance with the present invention is shown. The system 200 comprises a laser 202, a set of mirrors 204, a scanning surface 206, a processing board 208, a motor 210 to rotate the set of mirrors 204, and a power supply 212, all connected as shown. The processing board 208 is comprised of a photodetector 214, other associated processing devices 216 that are used to process received signals and output information to, e.g., a database (not shown), and a current limiting circuit 218 all connected as shown. The other associated processing devices 216 comprise a current limiting circuit 218.

Figure 3:
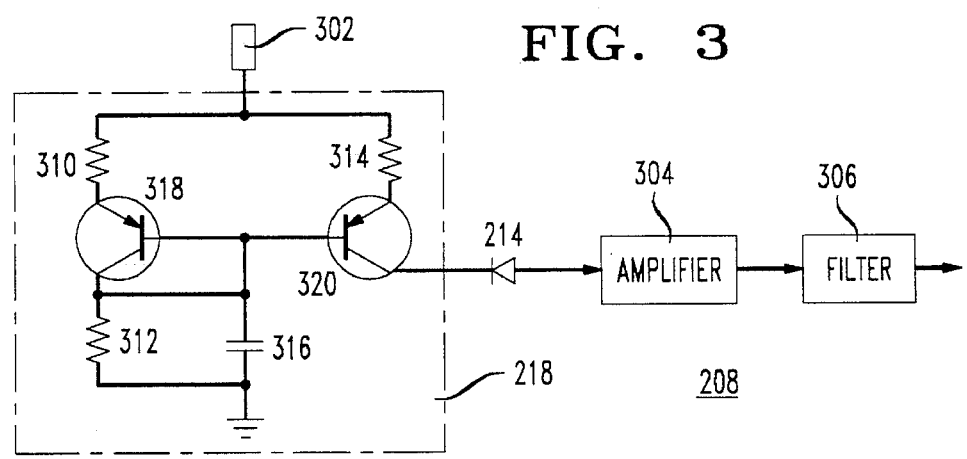
FIG. 3 shows a more detailed view of the processing board of FIG. 2.

Referring to FIG. 3, a more detailed view of the processing board 208 of FIG. 2 is shown. The processing board 208 is comprised of the photodetector 214, a bias voltage supply 302, an amplifier 304, a filter 306, and a current limiting circuit 218, all connected as shown.

Again referring to FIG. 3, the current limiting circuit 218 is comprised of resistor $R_1$ 310, resistor $R_2$ 312, resistor $R_3$ 314, capacitor $C_1$ 316, transistor Q1 318, and transistor Q2 320 all connected as shown. Preferably, resistor $R_1$ 310 is a 10 k$\Omega$ resistor, resistor $R_2$ 312 is a 2 M$\Omega$ resistor, resistor $R_3$ 314 is a 10 k$\Omega$ resistor, capacitor $C_1$ 316 is 0.1 µf capacitor, and transistors Q1 318 and Q2 320 bear part number 2N5087. The tolerances for the resistors and capacitors are ±5%. Further, the bias voltage supply 320 is twenty volts. This is the preferred voltage for the photodetector 214 which bears part number BPW34 manufactured by Siemens. This combination results in a maximum current of approximately 10 microamps through the photodetector.

The circuit has two distinct modes of operation. Under normal operating conditions (i.e., no intense light flashes), the current through the photodetector 214 is relatively low when compared with the current flow through Q1 318. Since the base and emitter of Q1 318 are coupled to the base and emitter of Q2 320, Q2 320 attempts to mirror the current flowing through Q1 318. However, the current that may flow through Q2 320 is limited to the current through the photodetector 214. Thus, Q2 320 saturates (i.e., acts as a closed switch). However, in a second mode, one in which the photodetector 214 is exposed to intense light flashes, Q2 320 comes out of saturation and behaves as a current source whenever the current through the photodetector 214 exceeds the current through Q1 318. Further increases in light intensity cause the voltage across the photodetector 214 to collapse from reversed bias to forward bias. This limits the current flowing into the amplifier to the current flowing through Q1, regardless of light intensity. Although the scattered signals are obscured under this condition, the amplifier can gracefully recover in a short amount of time (about 10 microseconds) once the intense light flash subsides.

The ability of the bar code scanning system 200 to recover quickly from intense light is important. This may be explained in terms of a duty cycle that measures the percent of time the bar code scanning system 200 is operative (e.g., not pinned) when being periodically exposed to intense light. Assume, for ease of explanation, that the time over which the photodetector 214 is actually exposed to intense light is negligible. Assume also that once the photodetector 214 is first exposed to intense light, it will be exposed again to intense light in 10 milliseconds due to the fact that the set of mirrors 204 rotates at a rate of 100 revolutions per second.

The bar code scanning system 100 of FIG. 1 gets pinned by intense light. Thus, its operative duty cycle is zero percent (it never is operative). As is apparent to those skilled in the art, the faster the recovery, the larger the operative duty cycle of the bar code scanning system 100. Theoretically, anything that would allow the bar code scanning system 100 to recover prior to 10 milliseconds elapsing would provide at least a small duty cycle during which bar codes could be read.

The bar code scanning system 200 of FIG. 2 recovers from intense light in about 10 microseconds. During the remainder of the time for each revolution (i.e., 9.99 milliseconds [10 milliseconds for a revolution minus 10 microseconds for recovery]), the bar code scanning system 200 is operative, resulting in a 99.99 percent operative duty cycle. Thus, instead being rendered inoperative 100 percent of the time when exposed to periodic intense light, the present invention limits this inoperative condition to about 0.01 percent of the time.

Although the invention has been described with respect to a fixed bar code scanning system, those skilled in the art will realize that the descriptions above are for purposes of illustration. Many variations to the above description will be apparent to those skilled in the art. For example, the current limiting circuit 308 could be used in conjunction with hand-held bar code scanning circuits. Further, the current limiting circuit could be used with fixed bar code scanning systems wherein the scanning surface 206 is a horizontal surface, a vertical surface, or both a vertical and horizontal surface such as that disclosed in U.S. Pat. No. 5,229,588 which is incorporated by reference herein as if set forth in its entirety. Additionally, the amplifier 304 may be a voltage amplifier as opposed to a current amplifier as shown in FIG. 2. In this case, the anode of the photodetector 214 would also be coupled to one end of a biasing resistor whose other end would, for example, be grounded. Further, the current limiting circuit could be used with any optical scanning system, not only bar code scanning systems. Further, a current limiting circuit in the form of a resistor could be used. However, this would degrade both the noise performance and the frequency response. Also, instead of using a UPC or bar code, the invention could be used in conjunction with any type of visual code. Finally, other items may be designed onto or off of the processing board 208. Those skilled in the art will realize that there are many other variations of the above described embodiment. Thus, the invention is defined by the appended claims.

What we claim is:

1. An optical scanning circuit for generating a current representing a scattered light pattern, the optical scanning circuit comprising:

(a) a photodetector for converting the scattered light pattern into current; and (b) a current limiting circuit coupled to the photodetector for enhancing the optical scanning circuit's ability to recover from an optical overload.

2. The optical scanning circuit of claim 1 wherein the optical scanning circuit is comprised of a bar code scanning circuit.

3. The optical scanning circuit of claim 1 further comprising a biasing circuit coupled to the photodetector.

4. The optical scanning circuit of claim 3 further comprising an amplifier coupled to the photodetector for processing a signal output from the photodetector to generate an amplified signal.

5. The optical scanning circuit of claim 4 further comprising a filter coupled to the amplifier for processing the amplified signal to generate a filtered signal.

6. The optical scanning circuit of claim 5 further comprising logic circuitry for analyzing the filtered signal to generate a logical representation of the light scattered.

7. The optical scanning circuit of claim 6 further comprising a storage element for storing a set of entries to which to compare to the logical representation.

8. The optical scanning circuit of claim 1 wherein the optical scanning circuit is housed on a printed circuit board.

9. An optical scanning system comprising:
(a) a light source;
(b) means for directing the light source;
(c) means for processing a scattered light pattern, the means for processing comprising:
  (1) a photodetector for generating a current representing the scattered light pattern;
  (2) means for biasing the photodetector;
  (3) an amplifier coupled to the photodetector; and
  (4) a current limiting circuit coupled to the photodetector for enhancing the optical scanning circuit's ability to recover from an optical overload; and
(d) means for outputting a signal representing the scattered light pattern.

10. The optical scanning system of claim 9 wherein the optical scanning system is comprised of a bar code scanning system.

11. The optical scanning system of claim 9 further comprising an amplifier coupled to the photodetector for processing a signal output from the photodetector to generate an amplified signal.

12. The optical scanning system of claim 11 further comprising a filter coupled to the amplifier for processing the amplified signal to generate a filtered signal.

13. The optical scanning system of claim 12 further comprising logic circuitry for analyzing the filtered signal to generate a logical representation of the scattered light pattern.

14. The optical scanning system of claim 13 further comprising a storage element for storing a set of entries to which to compare to the logical representation.

15. The optical scanning system of claim 9 wherein the means for processing is housed on a printed circuit board.

* * * * *